UNITED STATES PATENT OFFICE.

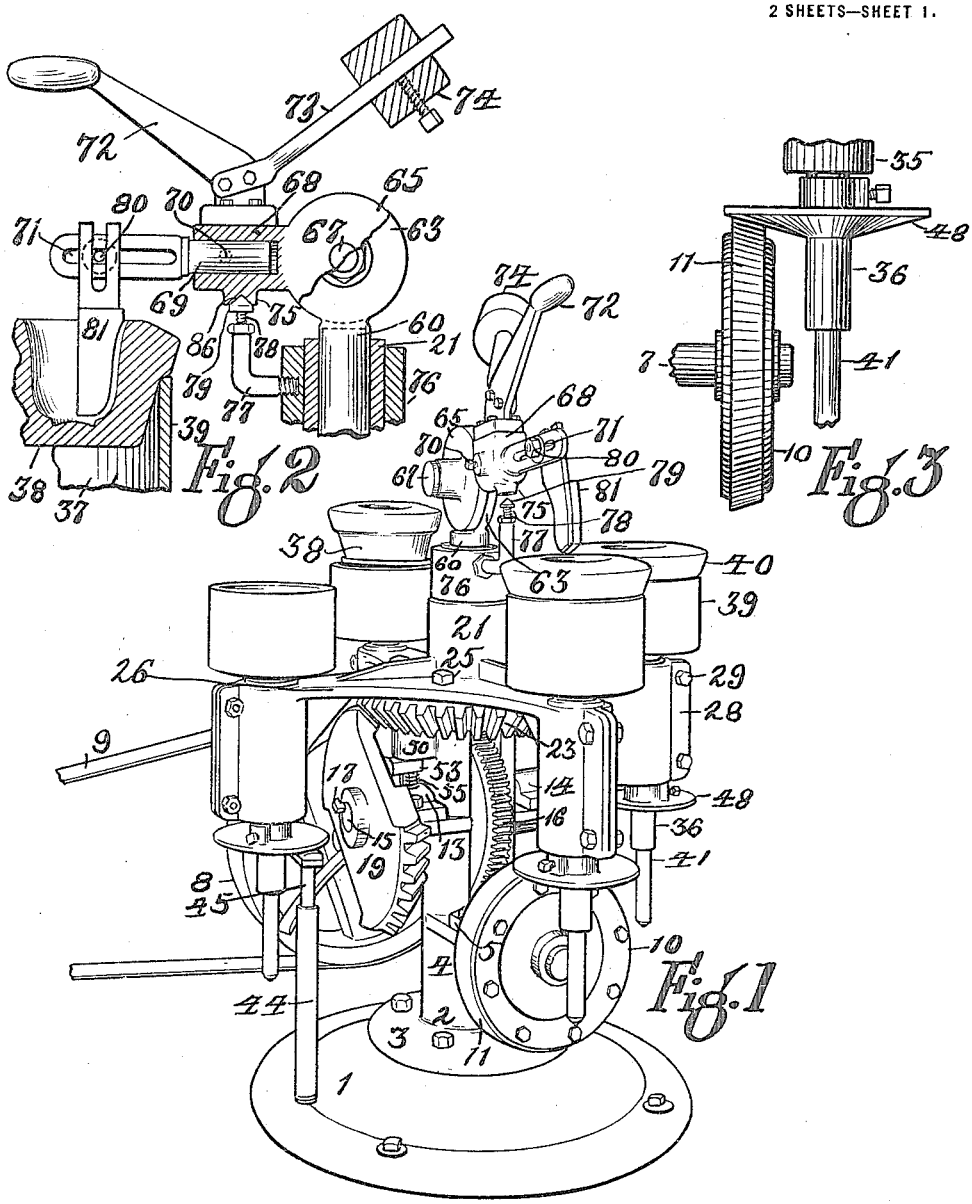

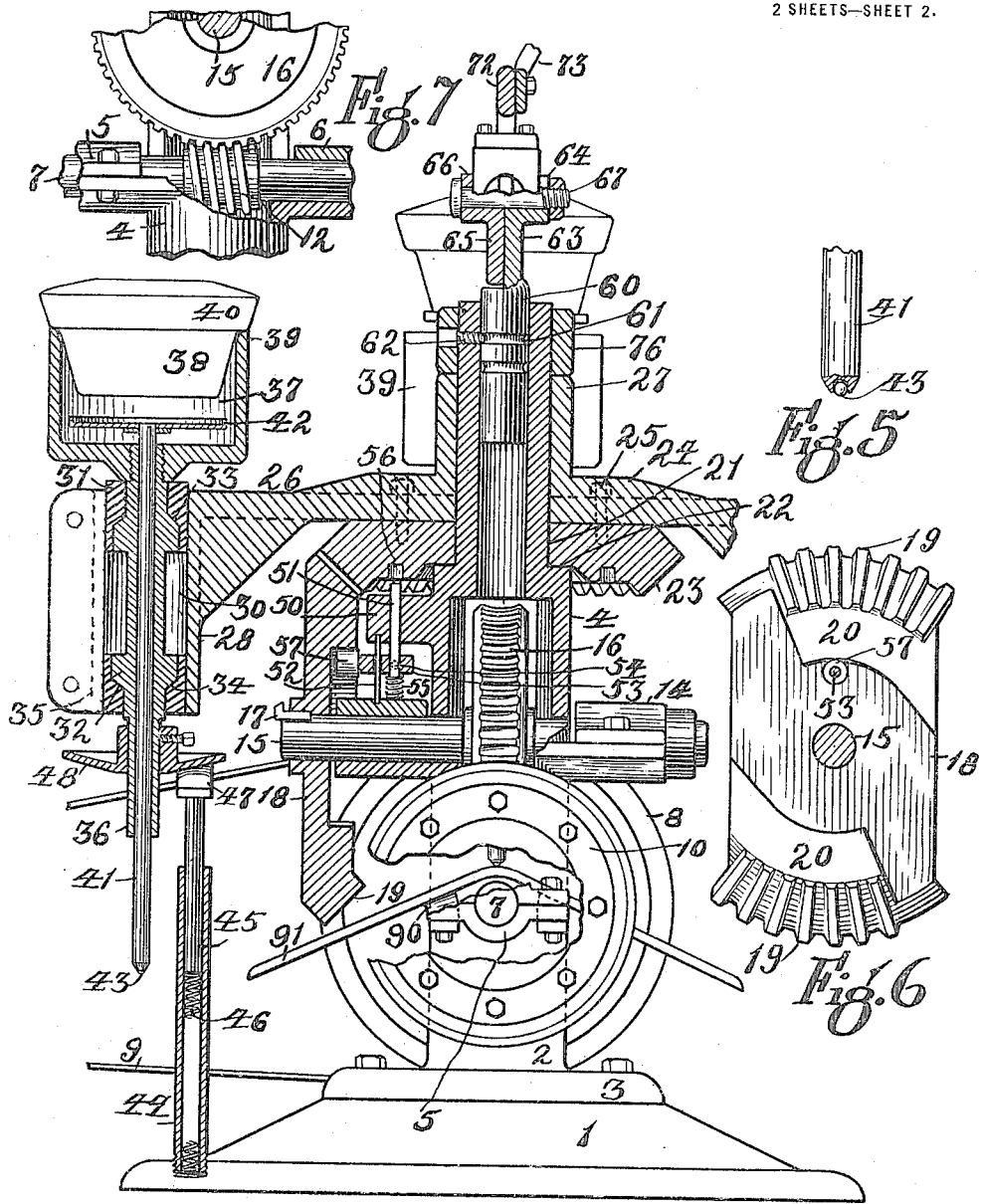

OSCAR C. McCORMICK, OF CLEVELAND, OHIO, ASSIGNOR OF ONE-FOURTH TO JAMES E. MOYER, OF AKRON, OHIO, ONE-FOURTH TO SAMUEL K. HINE, OF GIRARD, OHIO, ONE-EIGHTH TO JOHN W. WRIGHT, OF YOUNGSTOWN, OHIO, AND ONE-EIGHTH TO WILLIAM CANFIELD, OF PITTSBURGH, PENNSYLVANIA.

MACHINE FOR FORMING ARTICLES FROM PLASTIC MATERIAL.

1,202,863. Specification of Letters Patent. Patented Oct. 31, 1916.

Application filed July 10, 1916. Serial No. 108,368.

*To all whom it may concern:*

Be it known that I, OSCAR C. McCORMICK, a citizen of the United States, residing at Cleveland, in the county of Cuyahoga and State of Ohio, have invented new and useful Improvements in Machines for Forming Articles from Plastic Material, of which the following is a specification.

This invention relates to improvements in machines for forming articles, such for instance, as cups, saucers, plates, etc., from plastic clay preparatory to the final drying and burning thereof.

The primary object of the invention is to provide a simple, cheap and compact machine of the class named comprising a plurality of mold supports arranged to revolve orbitally to bring the various molds successively into operative position with respect to a forming tool which is designed to fashion an article in each mold as it is brought into position with respect to the tool. The device is intended to be used in connection with a loading machine arranged to place the molds each containing a batch of clay in the supports and a device for removing the molds containing the formed articles from the supports and place them on a conveyer for transportation to a drying room; these devices or mechanisms however, not forming any portion of this invention are not described nor shown, the present invention relating solely to the mechanism for bringing the molds for the formation of the articles into position with respect to the shaping tool.

A further object of the invention is to provide an improved mechanism for orbitally revolving a plurality of mold supports, each equipped with a mold, successively into position to permit of the forming of an article in each mold, said mechanism arranged to hold each mold stationary with respect to its orbital movement and rotate it on its own axis during the forming operation, and then move all of the molds to bring the next succeeding mold into position with respect to the forming tool.

A further object of the invention is to provide suitable mechanism for revolubly supporting the tool, so that in the event of an orbital movement of one of the molds previous to the withdrawal of the tool from engagement with the mold the tool will move with the mold, to be later withdrawn so that injury to either the tool, the mold or the formed article is thereby prevented.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a perspective view of the device embodying this invention. Fig. 2, is a transverse sectional view of the mechanism for supporting the forming tool, showing the same in operative relation with respect to a mold. Fig. 3, is a detail view in side elevation of the means for rotating each mold during the forming operation. Fig. 4, is a vertical central sectional view of the device shown in Fig. 1. Fig. 5, is a detail of the lower end of a rod used for ejecting the molds after the completion of the article. Fig. 6, is a side elevation of a gear employed in the device, and Fig. 7, is a side elevation of the driving shaft, its supports and connected mechanism.

Referring to the drawings in detail the reference numeral 1 denotes a base on which is mounted an upright housing designated generally by the reference numeral 2 and comprising a foot 3 and a hollow casing 4. The housing 2 is provided with alined bearings 5 and 6, see Fig. 7, in which is mounted a driving shaft 7. The shaft 7 bears at one end a belt pulley 8 receiving motion from a belt 9 and at its opposite end is provided with a friction driving wheel 10 the face 11 of which is preferably conically fashioned. The shaft 7 within the housing 2 is provided with a worm 12. The housing 2 is provided with a pair of alined outwardly-extending bearings 13 and 14 extending transversely of the axis of the shaft 7. Rotatably mounted in the bearings 13 and 14 is a countershaft 15 on which is mounted a worm-wheel 16 adapted to mesh with the worm 12 and receive motion thereby. Fixedly mounted by some means, such for instance, as a key 17 on the shaft 15 is a broken bevel gear 18 shown best in Fig. 6 and comprising two distinct series of teeth 19 oppositely disposed to one another. Extending inwardly from and integral with the teeth 19 are two cam-shaped members 20 for a purpose to be later described. The upright portion 4 of the housing 2 is provided with an upwardly-extending, hollow, integral cylindrical portion 21 forming with the portion 4 a shoulder 22, and rotatably mounted on the cylindrical portion 21 and supported by the shoulder 22 is an inverted bevel-gear 23 supporting a revoluble carrier designated generally by the reference numeral 24 which is connected with said gear by some means, such for instance, as screws 25. The carrier is provided with a plurality of radially-extending arms 26 and an upwardly-extending sleeve 27 surrounding the cylindrical portion 21 of the housing 2.

The number of arms 26 extending from the carrier 24 is immaterial and in the drawings four of these arms are shown and as all are similar, it is thought a description of one will be sufficient for the understanding of them all. Each arm 26 embodies an enlargement 28 with a bifurcated outer portion, the furcations of which are adapted to be drawn toward each other by clamping means, such for instance, as bolts 29. Extending through the enlargement 28 is a vertical cylindrical chamber 30 in the upper end of which is a bearing 31 and in the lower portion a bearing 32 both of which are adapted to be held in position by the clamping action of the members 29. The bearings 31 and 32 have reversely arranged bearing surfaces numbered respectively 33 and 34. Mounted in the bearings 31 and 32 is a rotatable, hollow sleeve having reversely arranged bearing surfaces adapted to coact with the bearing surfaces 33 and 34 for holding the sleeve from vertical movement. The lower end of the sleeve 35 is provided with a downwardly-extending sleeve-like extension 36 and the upper end is threaded to be received in a threaded opening in the lower wall of a cup-shaped mold carrier 37 adapted to support a forming mold 38. The molds 38 are provided with lateral flanges 40 arranged to seat on the upwardly-extending side wall 39 of the mold carrier 37 and be held, by frictional engagement therewith, against independent revolution. The interior of each mold is so fashioned as to impart a desired exterior configuration to the article to be formed therein. In the sleeve 35 is mounted a vertically shiftable rod 41 the upper end of which projects into the cavity of the mold carrier 37, and is there provided with a head 42. The lower end of each rod 41 is provided with a recess constituting a bearing for a friction reducing ball 43 for a purpose to be later described. The base 1 is provided with a threaded recess in which is mounted a tube-like member 44 containing a vertically shiftable plunger 45 normally shifted upwardly by a coil-spring 46. The upper end of the plunger 45 is provided with a head 47 the upper face of which constitutes a braking surface. Secured to the depending portion 36 of the sleeve 35 is an inverted frusto conically formed disk 48 of sufficient width to engage the braking surface on the head 47 as the arms 26 of the carrier move the mold supports orbitally for arresting revolution of each disk 48 and each supporting the member 37.

The upright portion 4 of the housing 2 is provided with a laterally offset lug 50 through which extends a vertical opening constituting a bearing for a vertically shiftable pin 51. Extending between the lug 50 and the cap of the bearing 13 is a guiding pin 52. Vertically shiftably mounted on the guiding pin 52 is an arm 53 provided with an opening to receive the pin 51 which is secured thereto by a cross pin 54 so that the pin 51 and arm 53 reciprocate vertically in unison. Between the arm 53 and the cap of the bearing 13 is a coiled spring 55 the normal tendency of which is to force the upper end of the pin 51 into recesses 56 accurately disposed in the under face of the gear 23 for locking the latter against revolution. Mounted on the free end of the arm 53 is a roller 57 arranged to be engaged by the inner faces of the cams 20 as the gear 18 revolves to thereby force the roller 57, arm 53 and pin 51 inwardly overcoming the spring 55 to withdraw the pin 51 from locking engagement with any one of the recesses 56 to permit revolution of the carrier 24.

Revolubly mounted in the upper end 21 of the housing 4 is a post 60 provided with one or more transverse grooves 61 into any one of which projects a set screw 62 for preventing vertical movement of the post 60 while permitting free horizontal revolution thereof. The post 60 terminates at its upper end in a circular or cylindrical head 63 provided with a laterally projecting hub 64 and complemental to the head 63 is a head 65 of a former arm to be described. The member 65 is also provided with laterally-extending hub 66, in alinement with the hub 64. Extending through the hubs 64 and 66 is a pivot pin or bolt 67 to permit vertical movement of the member 65 and its connected arm. The member 65 is provided with a tube-like extension 68 provided with a recess in which is mounted an arm 69 held in a determinate position by means of a set screw 70. The outer end of the arm 69 is provided with a slot 71. Secured to the upper portion of the arm 68 is an operating handle 72 and to this is secured an arm 73 bearing a counter weight 74. The under face of the arm 68 is provided with a depending lug 75 provided with a conical recess 86 in its lower face. Freely mounted on the extension 21 of the housing 2 and supported by the sleeve 27 of the carrier 24 is a collar 76 from which projects an L-shaped arm 77 the upper end of which is provided with a threaded recess to receive a set screw 78, the upper end of which is provided with a conical head 79 adapted to be inserted in the recess 86 for fixedly positioning and limiting the downward movement of the arms 68 and 69. Adjustably secured to the slotted portion of the arm 69 by means of a clamping screw 80 is an article-forming tool 81 and the connection between the two is such that the tool 81 may be lowered or raised as desired or shifted toward or away from the axis of the housing 2 and if desired the arm 69 may be shifted inwardly or outwardly toward the axis of the housing 2 to permit the tool 81 to fashion articles of different kinds and of different descriptions within the molds 38.

Secured to suitable supports 90 on the cap of the bearing 6 of the housing 2 in which is mounted the driving shaft 7 is a cam-bar 91 arranged to lie in the path of movement of the lower ends of the ejector rods 41 and adapted to be encountered by them for raising these rods and shifting the heads 42 thereof upwardly, for lifting the molds 38 out of their supports 37.

The operation of the device is as follows: Motion is communicated to the driving shaft 7 by means of the belt 9 applied to the pulley 8 which simultaneously rotates the worm 12 and friction wheel 10. The rotation of the worm 12 causes a simultaneous but slower rotation of the worm-wheel 16 and shaft 15. The broken gear 18 being mounted fixedly on the shaft 15 revolves in unison with the shaft and intermittently meshes with the gear 23 causing a similar movement of the carrier 24 thereby moving the mold carrier orbitally a fractional portion of a revolution to bring the molds into alinement with mechanism to be later described. On the inner face of the gear 18 are cams 20 the working faces of which are positioned to engage the roller 57 and shift the same downwardly in unison with the arm 53 and pin 51 to withdraw the working end of the latter from one of the recesses 56. This operation taking place just previous to the engagement of one series of teeth 19 on the gear 18 with the teeth on the gear 23 on which is mounted the carrier 24. The arm 69 carrying the article forming tool 81 under normal conditions will be at rest and its location determined by its engagement with the conical head 79 of the set screw carried by the arm 77 on the sleeve 76. During the rotation of the carrier to bring successive molds into position with respect to the forming tool 81, the arm 69 and forming tool 81 are moved upwardly by means of the operating handle 72 and when the various molds are stationary the tool 81 is brought down into position by the handle 72. The normal position of the arm 77 is immediately over the center of the shaft 7 and at the time that one of the mold carriers is similarly positioned the disk 48 on the arm carrying this mold is in engagement with the face 11 of the wheel 10 and receives motion therefrom, whereby the mold carrier and mold are rapidly rotated. After the termination of the forming operation the forming tool 81 is raised from the mold and the next succeeding mold brought into position for the forming tool 81. As each mold carrier leaves the position which it occupies during the fashioning of the article, the mold and carrier are ordinarily rapidly rotating and the disk 48 moves into engagement with the head 47 which constitutes a braking element for arresting further rotation of the mold and its carrier. During the orbital movement of each mold carrier after the forming and braking operation the lower end of the rod 41 bearing the friction reducing ball 43 engages and rides upwardly over the inclined cam bar 91 thereby raising each rod 41 causing the head 42 thereof to raise a mold 38 into position to be grasped by the unloading tool which forms no portion of this invention and is therefore not shown or described.

It is contemplated that mechanism will be provided for supplying molds to the mold carrier, each of the former provided with a batch of clay which is to be fashioned into a desired shape by the forming tool 81, when brought into position therefor. It frequently happens that, through an oversight or other reason, the intermittent orbital movement of the carrier 24 commences before the completion of the forming operation and experience has shown that if the article forming tool 81 is fixedly mounted, either the tool, the mold or some other part of the mechanism will be seriously damaged, and hence the tool 81 is supported and mounted revolubly so as to permit its movement orbitally in unison with the mold until the tool can be withdrawn from the mold. The arm 77 bearing the set screw 78 having a conical head constitutes means for centering and temporarily determining the position of the forming tool 81 with respect to the mold, but the arm 77 in case of an accident or delayed withdrawal of the fashioning tool from the mold is capable of orbital movement to permit later withdrawal of the tool 81 therefrom, thereby avoiding danger of breakage of the mold or tool.

It may be pointed out that the friction wheel 10 is constantly revolving and the various mold carriers are rotated on their own axes as the various disks 48 are brought into engagement therewith and the rotation of said mold carriers is arrested by the braking member 47. Also the molds in the various carriers are successively ejected from their carriers or are lifted into a position to be removed, by means of the ejecting rods 41 engaging the upper surface of the cam bar 91.

I claim—

1. A device of the character described comprising a housing, a carrier revolubly mounted thereon, a mold support on said carrier arranged to move orbitally about said housing, means to rotate said support on its own axis, a braking element positioned in the path of movement of said support for arresting rotation thereof, a forming tool secured to said housing and capable of vertical movement to bring the tool into operative relation with a mold on said support while said support is in engagement with said rotating means.

2. A device of the character described comprising a housing, the upper portion of which constitutes a bearing, a carrier comprising a sleeve revolubly mounted on said bearing and provided with a radial arm, a mold support rotatably mounted in the outer end of said arm and arranged to move orbitally about said housing, means to rotate said support on its own axis, a braking element positioned in the path of movement of said support for arresting rotation thereof, a forming tool secured to said housing and capable of vertical movement to bring the tool into and out of operative relation with a mold on said support while said support is in engagement with said rotating means.

3. A device of the character described comprising a housing the upper portion of which constitutes a bearing, a carrier comprising a sleeve and a radial arm revolubly mounted on said bearing, a mold support on the outer end of said arm arranged to move orbitally about said housing, means to rotate said mold support on its own axis, a braking element arranged to engage said support after the termination of the engagement of said support with said rotating means for arresting rotation of said support, a forming tool secured to said housing and capable of vertical movement to bring the tool into operative relation with a mold on said support while said support is in engagement with said rotating means.

4. A device of the character described comprising a housing the upper portion of which constitutes a bearing, a carrier comprising a sleeve and a radial arm mounted on said bearing, a mold support rotatably mounted on the end of said arm and capable of independent rotation on its own axis and also of orbital movement about said housing, means to rotate said support positioned in the path of movement of said support, a brake also in said path of movement arranged to be engaged by said support for arresting rotation of said support, a forming tool secured to said housing and capable of vertical movement to bring the tool into operative relation with a mold on said support while said support is in engagement with said rotating means.

5. A device of the character described comprising a housing, the upper portion of which constitutes a bearing, a radially-extending arm the outer end of which is bifurcated and provided with means to clamp the furcations thereof toward each other, a pair of reversely arranged bearings held by said clamping means, a mold support provided with portions coacting with said bearings to permit rotation of said mold support on its own axis while permitting orbital movement of said support about said housing, means positioned in the path of movement of said support to rotate said support, a braking element also in the said path of movement for arresting further rotation of said support, a forming tool secured to said housing and capable of vertical movement to bring the tool into operative relation with a mold on said support while said support is in engagement with said rotating means.

6. A device of the character described comprising a housing the upper portion of which constitutes a bearing, a carrier comprising a sleeve and a radially-extending arm revolubly mounted on said bearing, clamping means positioned at the outer end of the said arm, a pair of reversely arranged bearings secured in position by said clamping means, a mold support provided with portions coacting with said bearings, means to rotate said support on its own axis while permitting orbital movement of the same about said housing, a braking element positioned to be engaged by said support for arresting rotation thereof, a forming tool secured to said housing and capable of vertical movement to bring the tool into operative relation with a mold on said support while said support is in engagement with said rotating means.

7. A device of the character described comprising a housing the upper portion of which constitutes a bearing, a carrier comprising a sleeve having a radially-extending arm revolubly mounted on said bearing, clamping means secured to the outer end of said arm, a mold support comprising a tubular portion held in position by said clamping means, a cup-shaped head on said tubular portion to sustain a mold, a depending portion, a disk carried by said depending portion, a friction wheel adapted to be engaged by said disk for rotating said mold support on its own axis, a braking element positioned in the path of movement of said support for arresting rotation thereof, a forming tool secured to said housing and capable of vertical movement to bring the tool into operative relation with a mold on said support while said support is in engagement with said rotating means.

8. A device of the character described comprising a housing the upper portion of which constitutes a bearing, a carrier comprising a sleeve provided with a radial arm revolubly mounted on said bearing, a mold support comprising a cup-shaped head and a depending tubular portion mounted for rotation on its own axis in the end of said arm and arranged to move orbitally about said housing, a vertically shiftable rod mounted in the tubular portion of said mold support, a head on said rod within said cup-shaped portion, a revoluble friction disk adapted to engage said mold support for rotating on its own axis, a braking element positioned in the path of movement on said support for arresting further rotation thereof, a forming tool secured to said housing and adapted to be brought into operative relation with a mold on said support while said support is in engagement with said rotating means and a cam bar lying in the path of movement of said rod for vertically shifting the latter and the head thereof to eject molds from said cup-shaped portion.

9. A device of the character described comprising a housing the upper portion of which constitutes a bearing, a carrier comprising a sleeve provided with a radial arm revolubly mounted on said bearing, a mold support comprising a cup-shaped head and a depending tubular portion mounted for rotation on its own axis in the end of said arm and arranged to move orbitally about said housing, a vertically shiftable rod mounted in the tubular portion of said mold support, a head on said rod within said cup-shaped portion the lower end of said rod provided with friction reducing means, a revoluble friction disk adapted to engage said mold support for rotating on its own axis, a braking element positioned in the path of movement on said support for arresting further rotation thereof, a forming tool secured to said housing and adapted to be brought into operative relation with a mold on said support while said support is in engagement with said rotating means and a cam bar lying in the path of movement of said rod for vertically shifting the latter and the head thereof to eject molds from said cup-shaped portion.

10. A device of the character described comprising a housing, a carrier revolubly mounted thereon, a mold support on said carrier arranged to move orbitally about said housing, means to rotate said support on its own axis, a braking element positioned in the path of movement of said support for arresting rotation thereof, a radial arm revolubly mounted on said housing, a forming tool carried by said arm and capable of coöperation with a mold on said support while said support is in engagement with said rotating means, said radially movable post adapted to engage said tool bearing arm for limiting the downward movement of said tool with respect to said mold.

11. A device of the character described comprising a housing, a carrier revolubly mounted thereon, a mold support on said carrier arranged to move orbitally about said housing, means to rotate said support on its own axis, a braking element positioned in the path of movement of said support for arresting rotation thereof, a sleeve mounted on said housing above said carrier, a radial arm on said sleeve provided with an adjustable termination, an arm bearing, a forming tool revolubly mounted on said housing above said sleeve, said tool bearing arm capable of vertical movement to bring the tool into operative relation with a mold and engage the end of said first arm for limiting the downward movement thereof, both of said arms being capable of movement in unison with said mold orbitally about said housing when said tool is not removed from said mold previous to the orbital movement of the latter.

12. A device of the character described comprising a housing the upper portion of which constitutes a bearing, a driving shaft mounted in said housing, a friction disk carried by said shaft, a counter-shaft rotatably mounted in said housing, gearing connecting said shafts, a broken gear on said counter-shaft, a carrier revolubly mounted on said bearing, a gear secured to said carried and adapted to be intermittingly engaged by said broken gear for causing a partial revolution of the latter, a mold support on said carrier arranged to move orbitally about said housing and engage said friction disk for rotating it, a braking element positioned in the path of movement of said support for arresting rotation thereof, a forming tool adapted to coöperate with a mold on said support while said support is in engagement with said friction disk.

13. A device of the character described comprising a housing, the upper portion of which constitutes a bearing, a carrier revolubly mounted thereon, a gear connected to said carrier, a driving shaft rotatably mounted in said housing, a friction disk carried by said driving shaft, a countershaft mounted in said housing, gear connections between said shafts, a broken gear on said counter-shaft adapted to intermittingly engage a gear on said carrier for moving the same a determined fractional portion of a revolution, a mold support on said carrier arranged to move orbitally about said housing, said support arranged to engage said friction wheel for rotating it, means to arrest rotation of said support after the disengagement of said support and friction wheel, a forming tool arranged to coöperate with a mold on said support while said support is in engagement with said friction disk.

14. A device of the character described comprising a housing the upper portion of which constitutes a bearing, a carrier revolubly mounted on said bearing, a gear secured to said carrier, a driving shaft rotatably mounted in said housing, a friction wheel on said shaft, a counter-shaft in said housing, gear connections between said shafts, a broken gear on said counter-shaft arranged to intermittingly engage the gear on said carrier to revolve the latter a definite fractional portion of a revolution, locking mechanism to hold the carrier in a fixed position, means for releasing said lock to permit revolution of said carrier, a mold support on said carrier arranged to move orbitally about said housing, means on said support arranged to engage said friction wheel for rotating said mold, means for arresting rotation of said support after its movement away from said friction wheel, a forming tool capable of orbital movement adapted to coact with a mold on said support while said support is in engagement with said friction disk.

15. A device of the character described comprising a housing provided with a bearing, a carrier revolubly mounted thereon, a gear secured to said carrier, said gear provided with a recess, a driving shaft mounted rotatably in said housing, a counter-shaft also mounted in said housing, gearing connecting said shafts, a broken gear adapted to mesh with the gear on said carrier for intermittingly revolving said carrier, said gear further provided with cam faces, a shiftable pin mounted in said housing adapted to coact with said recess and to be withdrawn therefrom by engagement with the cam faces in said broken gear, a mold support on said carrier arranged to move orbitally about said housing, means to rotate said support on its own axis, a brake for arresting revolution of said support and a forming tool secured to said housing capable of coöperation with a mold on said support during the rotation of said support on its own axis.

16. A device of the character described comprising a housing provided with a bearing and also provided with a support for a shiftable locking pin provided with a projecting arm, a carrier comprising a sleeve having a plurality of radially-extending arms, a gear connected to said carrier provided with a plurality of recesses corresponding in number and relative positions with respect to the arms on said carrier, a driving shaft mounted in said housing, a friction wheel mounted on said shaft, a counter-shaft mounted in said housing, gearing connecting said shafts, a broken gear mounted on said counter-shaft and arranged to intermittingly mesh with the gear on said carrier for rotating the latter a definite fractional portion of a revolution, said broken gear further provided with cam faces arranged to coact with the arm on said locking pin for withdrawing said locking pin from engagement with the recesses in the gear on said carrier previous to the intermeshing of the toothed portions of the broken gear with the gear on said carrier to permit revolution of the gear, a mold support on each arm of said carrier arranged to move orbitally about said housing, each support adapted to engage said friction driving wheel when brought into engagement with said friction driving wheel, a braking element for arresting rotation of each support after the disengagement thereof with respect to said friction wheel and a forming tool adapted to coact with a mold on each support while said support is in engagement with said friction wheel.

17. A device of the character described comprising a housing, a carrier revolubly mounted thereon, means to revolve said carrier a definite fractional portion of a revolution, means to lock said carrier against movement, a rotatable mold support on said carrier, means to rotate said support on its own axis when the orbital movement thereof ceases, means to release said lock, means to arrest the rotation of said support upon a resumption of the orbital movement, and means to later eject a mold from said support.

In testimony whereof I have hereunto set my hand.

OSCAR C. McCORMICK.